US012642165B2

(12) United States Patent
Walter

(10) Patent No.: US 12,642,165 B2
(45) Date of Patent: Jun. 2, 2026

(54) METHOD FOR TREATING A USABLE AGRICULTURAL AREA, RECORDING AND SPRAYING DEVICE FOR AN AGRICULTURAL VEHICLE, AND COMPUTER PROGRAM PRODUCT

(71) Applicant: Robert Bosch GmbH, Stuttgart (DE)

(72) Inventor: Michael Walter, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 393 days.

(21) Appl. No.: 18/561,342

(22) PCT Filed: Apr. 7, 2022

(86) PCT No.: PCT/EP2022/059240
§ 371 (c)(1),
(2) Date: Nov. 16, 2023

(87) PCT Pub. No.: WO2022/242953
PCT Pub. Date: Nov. 24, 2022

(65) Prior Publication Data
US 2024/0224843 A1 Jul. 11, 2024

(30) Foreign Application Priority Data

May 20, 2021 (DE) ..................... 10 2021 205 123.5

(51) Int. Cl.
*A01C 23/00* (2006.01)
*A01C 21/00* (2006.01)
*A01C 23/04* (2006.01)

(52) U.S. Cl.
CPC .......... *A01C 23/007* (2013.01); *A01C 21/005* (2013.01); *A01C 23/047* (2013.01)

(58) Field of Classification Search
CPC ... A01C 23/007; A01C 23/047; A01C 21/005; H04L 12/417
(Continued)

(56) References Cited

U.S. PATENT DOCUMENTS

2005/0189918 A1 9/2005 Weisgerber et al.
2009/0234508 A1* 9/2009 Kallfass ................ E02F 9/2267
700/282
(Continued)

FOREIGN PATENT DOCUMENTS

DE 102008013602 A1 9/2009
DE 102013020802 A1 8/2014
(Continued)

OTHER PUBLICATIONS

Ben Telford, What is NTP? A Begginner's Guide to Network Time Protocol, Mar. 11, 2019, Galleon Systems, pp. 1-10.*

*Primary Examiner* — Andrew R Dyer
(74) *Attorney, Agent, or Firm* — NORTON ROSE FULBRIGHT US LLP

(57) ABSTRACT

A method for treating a usable agricultural area by means of a preferably liquid medium or spraying agent. In the method: when the usable area is driven over, the usable area to be treated is recorded transversely to a travel direction of a recording and spraying device by means of a plurality of image-capturing sensor units which each have a recording range; the image information from a sensor unit is processed by means of a local control unit assigned to the sensor unit; when it is necessary to actuate at least one metering valve for the medium or spraying agent, which metering valve is assigned to the particular recording range, information is transmitted between the local control unit and a main control unit on at least one CAN bus system.

10 Claims, 2 Drawing Sheets

(58) Field of Classification Search
USPC .......................................................... 700/283
See application file for complete search history.

(56) References Cited

U.S. PATENT DOCUMENTS

| 2015/0059626 | A1* | 3/2015 | Conrad | A01M 7/0092 |
| | | | | 111/120 |
| 2016/0178422 | A1* | 6/2016 | Humpal | A01M 7/006 |
| | | | | 239/71 |
| 2021/0068338 | A1* | 3/2021 | Stoller | A01C 7/06 |

FOREIGN PATENT DOCUMENTS

| DE | 102015002324 | B3 | 3/2016 |
| DE | 102016123539 | A1 | 6/2018 |

* cited by examiner record image
of usable area — 102 load image
information into
memory — 104 evaluate image
data — 106 send message
from local control
device to main
control unit — 108 receive message — 110 calculate time
at which a metering
valve must be
actuated — 112 send spraying
order — 114 receive spraying
order — 116 actuate metering
value — 118

1

METHOD FOR TREATING A USABLE AGRICULTURAL AREA, RECORDING AND SPRAYING DEVICE FOR AN AGRICULTURAL VEHICLE, AND COMPUTER PROGRAM PRODUCT

FIELD

The present invention relates to a method for treating a usable agricultural area by means of a preferably liquid medium for fertilizing purposes, for weed or fungus control, or for other such applications. The present invention also relates to a recording and spraying device for an agricultural vehicle, having control units which communicate with one another on a CAN bus system in accordance with a method according to the present invention, and to a computer program product for carrying out the method or as a component of the recording and spraying device.

BACKGROUND INFORMATION

German Patent Application No. DE 10 2016 123 539 A1 describes, in connection with an agricultural distribution machine for treating a usable agricultural area using a preferably liquid medium, using a main control unit that communicates via a CAN bus system to actuate local control units that are assigned to metering valves. Details relating to a synchronization of the individual control devices for actuating metering valves are not to be found in the cited document. Furthermore, in the context of automotive applications, German Patent Application No. DE 10 2013 020 802 A1 describes carrying out a time synchronization in a CAN network of a motor vehicle by means of reference messages that are fed into the CAN bus system by a master control unit and recorded by slave control units.

SUMMARY

A method according to the present invention for treating a usable agricultural area by means of a preferably liquid medium may have the advantage that, in conjunction with image-capturing sensor units for recording vegetation on the usable area and metering valves assigned to the image-capturing sensor units for applying the preferably liquid medium, it enables high-precision actuation of the metering valves when using a CAN bus system. This enables a minimization of media consumption with locally precise application of the medium to the usable area or vegetation.

The present invention takes into account the variable time lags or runtimes that necessarily occur when sending information or data on the at least one CAN bus system by means of synchronization between a main control unit, local control units (which are assigned to the image-capturing sensor units), and metering control units. According to an example embodiment of the present invention, this is done by starting a first counter in the main control unit, a second counter in the relevant local control unit and a third counter in the relevant metering control unit, and recording the counter state of the first counter by the local control units and the metering control units, taking into account the difference between the counter states of the individual control units, in order to enable high-precision actuation of the metering valve by the metering control unit.

Advantageous developments of the method according to the present invention for treating a usable agricultural area by means of a preferably liquid medium are disclosed herein.

In a first preferred embodiment of the method of the present invention, it is provided that the counter state of the first counter is sent at regular intervals via the at least one CAN bus system, a callback for updating the first counter state being carried out immediately before the counter state of the first counter is sent, and that the difference between the counter state of the first counter and the second counter and the difference between the counter state of the first counter and the third counter is calculated and stored each time it is received by the local control unit and the metering control unit. The regular interval between sending current counter states from the main control unit is for example 100 ms. A regular repetition of current counter states of the main control device as described so far causes the tolerances in the transmission duration to be minimized, so that high-precision synchronization of the individual control units is achieved, which promotes metering accuracy during the dispensing of the medium. In addition, as a result tolerances and temperature dependencies of the individual counters, which (actually) run at the same speed, between the individual control units can be compensated for.

In a preferred variant of the method according to the present invention, it is provided that when the counter state of the first counter is received in the second counter and the third counter, a callback is immediately carried out to record the counter state of the second counter and the third counter. As a result, calculation errors in the differential calculation of counter states, caused by variable, internal delays in the local control units and the metering control units, can be minimized.

According to an example embodiment of the present invention, in order to enable a high-precision calculation of the differences of the counter states, it is preferably provided that the steps of the counter states of the counters are incremented at a time interval of 1 μs. In particular, it is provided that the counter is incremented upward in steps of 0 to $2^{32}$-1 steps, and that the counter then overflows and starts again at zero. For this purpose, the processors of the individual control units have corresponding crystals, which, with the number of steps mentioned, leads to a time period of more than 70 minutes, which is sufficient for normal applications, before the counter overflows or restarts at zero.

According to an example embodiment of the present invention, it is also particularly preferably provided that the items of information from the local control units are fed individually into the at least one CAN bus system in a defined sequence and at defined intervals. This reduces the required bus load and system outlay. Typical repetition rates for image capturing by the sensor units are 15 Hz.

Since a synchronization is carried out of the counters of the control units, it is not necessary to start the counters of the control units connected to the network at the same time, which further reduces the required system and software outlay. This means that even a control unit that crashes and reboots can participate precisely in the time synchronization again within a very short time without any additional effort.

According to an example embodiment of the present invention, it may also be provided that the duration of a message sent by the main control unit relating to the first counter state between the sending of the message and its receipt by the local control unit and/or the metering control unit is recorded and taken into account when calculating the difference between the first counter state and the second counter state and between the first counter state and the third counter state. Average runtimes of a time message of the main control unit can therefore be taken into account when taking into account the local offset.

According to an example embodiment of the present invention, in order to actuate the individual metering valves in a timely manner, it is also advantageous if the time of the activation of the metering valve is calculated by the metering control unit on the basis of the geometry and/or the arrangement of the recording range of the sensor unit and of the metering valve to the usable agricultural area, a driving speed of an agricultural vehicle carrying the recording and spraying device in the direction of travel, and parameters of the metering valve.

Furthermore, the present invention comprises a recording and spraying device for an agricultural vehicle. According to an example embodiment of the present invention, the recording and spraying device has a plurality of preferably image-capturing sensor units, a plurality of metering valves assigned to the sensor units, a plurality of local control units assigned to the image-capturing sensor units, and a plurality of metering control units assigned to the metering valves. Furthermore, the recording and spraying device comprises a main control unit, wherein the main control unit, the local control units and the metering control units are connected to one another for data transmission by means of at least one CAN bus system, and wherein the main control unit, the local control units and the metering control units are designed to carry out a method according to the present invention as described above.

The present invention also comprises a computer program product, in particular a data carrier or a data program, which has an algorithm for carrying out at least one method step of a method according to the present invention, or which serves as a component of a recording and spraying device.

Further advantages, features, and details of the present invention can be found in the following description of preferred embodiments of the present invention and with reference to the figures.

DETAILED DESCRIPTION OF EXAMPLE EMBODIMENTS

Figure 1:
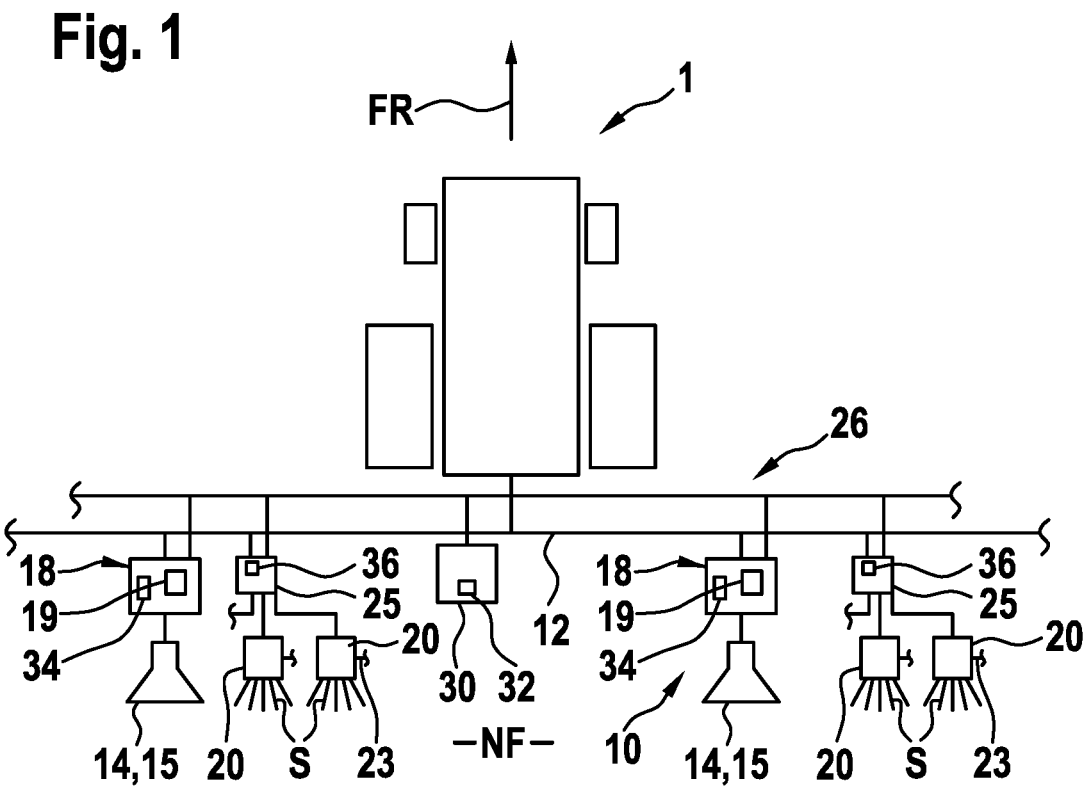
FIG. 1 shows, in a simplified plan view, an agricultural vehicle for treating a usable area by means of a preferably liquid spraying agent, according to an example embodiment of the present invention.

Identical elements or elements which have the same function are provided with the same reference signs in the drawings.

FIG. 1 shows a simplified illustration of an agricultural vehicle 1 traveling in a direction FR in order to treat a usable agricultural area NF. The treatment of the usable agricultural area NF is preferably a treatment of plants or weeds on the usable area NF with an in particular liquid spraying agent S. Depending on the type of treatment, this can be a fertilizer, a pesticide, a fungicide, or similar spraying agent S or medium.

The liquid spraying agent S or medium is also stored on the agricultural vehicle 1 in the area of a storage tank, as is known per se and is therefore not shown.

The agricultural vehicle 1 has, for example, in its rear area, a recording and spraying device 10 which has a support element in the form of a frame 12 extending transversely to the direction of travel FR of the agricultural vehicle 1. In the area of the frame 12, a plurality of image-capturing sensor units 14 in the form of cameras 15 are arranged in the longitudinal direction of the frame 12, preferably at equal distances from one another. Typically, between 24 and 36 such sensor units 14 or cameras 15, all of which are in particular identical in design, are provided over the entire width or length of the frame 12. A sensor unit 14 or camera 15 typically has a working width of 1.0 m or 1.5 m, seen in the longitudinal direction of the frame 12. With the indicated number of sensor units 14 or cameras 15, this results in a length of the frame 12 in the longitudinal direction of, typically, 36 m, where the length of the frame 12 can be between approximately 15 m and 50 m, with a correspondingly matched number of sensor units 14 or cameras 15.

Figure 2:
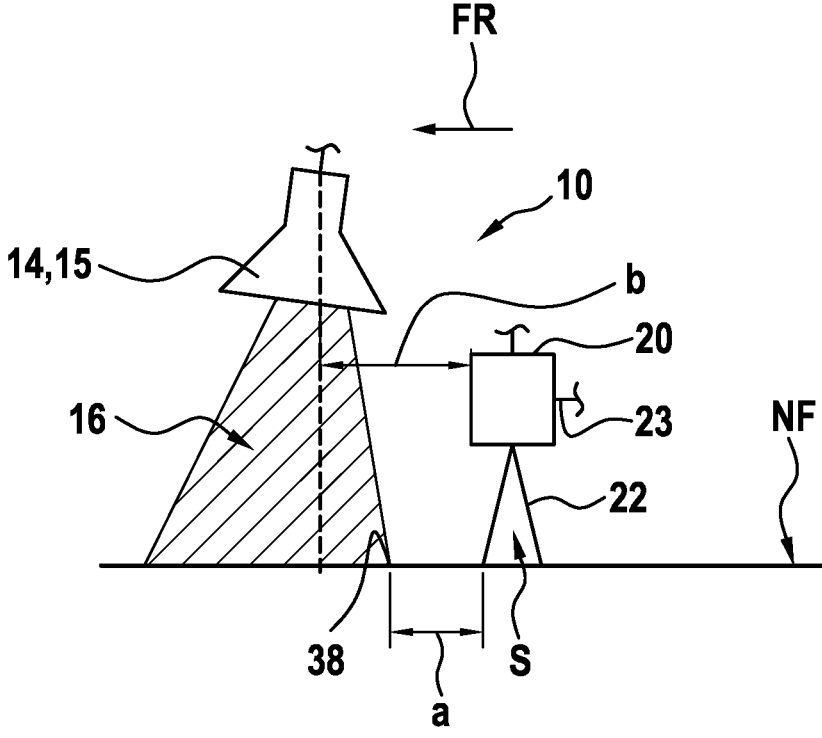
FIG. 2 shows a representation of the arrangement of an image-capturing sensor unit and a metering valve, according to an example embodiment of the present invention.

As shown in FIG. 2, a sensor unit 14 has a recording range 16 in the direction of travel FR, in which plant growth or weed growth on the usable area NF can be recorded by the camera 15 or the sensor unit 14. Each sensor unit 14 is also assigned a local control unit 18, which is used in particular to evaluate the camera images by means of a corresponding algorithm 19. A sensor unit 14 or camera 15 is preferably arranged together with the local control unit 18 in a common housing (not shown).

Furthermore, for dispensing or spraying the liquid medium or spraying agent S in question, each sensor unit 14 is assigned at least one metering valve 20, typically a plurality of metering valves 20 with a distance of approximately 25 cm or 50 cm between the metering valves 20 in the longitudinal direction of the frame 12. With a working width of a sensor unit 14 or a camera 15, between 4 and 6 dispensing valves 20 are therefore assigned thereto.

According to the illustration in FIG. 2, the metering valve 20 has, for example, a spray cone 22 which adjoins the recording range 16 at a first distance a, at the level of the usable area NF. Furthermore, the arrangement of the metering valve 20 relative to the sensor unit 14 is such that there is a second distance b between the sensor unit 14 and the metering valve 20 when viewed in the direction of travel FR, such that the arrangement of the metering valve 20 is behind the sensor unit 14 when viewed in the direction of travel FR.

The actuation of the metering valves 20 assigned to a sensor unit 14, which are each connected via a pressurized liquid line 23 to the mentioned storage container for the medium or spraying agent S, is carried out in particular via, in each case, a magnetic actuator of the metering valve 20, which can be actuated by a metering control unit 25 with corresponding output stages (alternatively, the output stages can also be arranged directly on the metering valves 20, in which case changes to the structure described below may be necessary).

Both the individual local control units 18 and the (local) metering control units 25 are coupled to a CAN bus system 26 via data lines. Alternatively, it is also possible for the sensor units 14 or cameras 15 and the metering control units 25 to communicate with one another on separate CAN bus systems (not shown). A communication with a main control unit 30 takes place via the CAN bus system 26. In the exemplary embodiment, the main control unit 30 is shown as a control unit separate from the (local) metering control units 25. However, it can also be provided that one of the (local) metering control units 25 (additionally) has the functionality of the main control device 30.

In particular, starting times and actuation times of the metering valves 20 are calculated by the main control unit 30 after receiving corresponding data or information from the local control units 18 via a required actuation of corresponding metering valves 20 for dispensing the spraying agent S or medium. This serves to ensure that a metering valve 20 is controlled by its metering control unit 25 as required in such a way that a targeted treatment of the corresponding plant or weed growth on the usable area NF is enabled.

The data exchange between the local control units 18, the metering control units 25 and the main control unit 30 on the CAN bus system 26 takes place in a defined sequence, wherein the data exchange has a variable time lag between the reception or transmission of corresponding data on the CAN bus system 26.

These are also specially designed for the time synchronization of the main control unit 30, the local control units 18, and the metering control units 25. The main control unit 30 thus has a first counter 32, which counts up in 1 μs steps from 0 to $2^{32}$-1 and then starts again at zero. The current counter state of the first counter 32 is transmitted for example every 100 ms by the main control unit 30 via the CAN bus system 26. Particular care is taken here to ensure that the message regarding the current counter state of the first counter 32 has the highest priority on the CAN bus system 26, and also that the counter state is updated again immediately before transmission via a so-called callback. It is thereby achieved that the tolerances of the transmission duration on the CAN bus system 26 are minimized. Furthermore, each local control unit 18 has a second counter 34, and each metering control unit 25 has a third counter 36. These counters 34 and 36 also count in 1 μs steps from 0 to $2^{32}$-1; then their counters 34 and 36 also overflow and start again at zero. It is also essential here that the counters 32, 34, and 36 do not have to be switched on or start at the same time.

As soon as the local control units 18 and the metering control units 25 receive the counter state of the first counter 32 via the CAN bus system 26, a callback is triggered which records its own counter 34, 36 immediately upon receipt of the time message from the main control unit 30 or the counter state of the first counter 32. The difference between the counter state of the first counter 32 (i.e. of the main control device 30) and the counter state of the second counter 34, and between the first counter 32 and the third counter 36, is then recorded. The corresponding differences (offsets) are stored. It is particularly advantageous to smooth these differences using suitable filter algorithms (median, PT1, floating average, etc.).

The counters 32, 34 and 36 of the main control unit 30, the local control units 18, and the metering control units 25 all run on the basis of a quartz crystal of the processor clock and are very stable. It can therefore be assumed that the values of the individual offset are fairly stable over a period of a few minutes.

As soon as a sensor unit 14 makes an image of the usable area NF, it records its local time stamp (counter state) on the basis of its own counter 34. It converts this into a corresponding counter state of the first counter 32 by addition of the offset. The image captured by the sensor unit 14 is processed in the local control unit 18 with variable computer runtime, whereupon this information is subsequently sent to the main control unit 30 via the CAN bus system 26 when a dispensing of spraying agent S or medium is required. Here the time of the image recording by the sensor unit 14 is entered in the message on the CAN bus system 26 according to the counter state of the first counter 32. The message is sent with normal CAN transmission via the CAN bus system 26, i.e. with variable runtime. The main control unit 30 receives the message and calculates, for the at least one metering valve 20 assigned to the sensor unit 14 in the image (section), the time in the future (in relation to the counter state of the first counter 32) at which the corresponding metering valve 20 has to be switched on, and its switch-on duration. This is used to calculate a request message to the relevant local metering control unit 25 that contains the start time and the spray duration. The corresponding metering control unit 25 receives the message and converts the time into its own local time according to the counter state of the third counter 36 by subtracting its own local offset and the start time received from the main control unit 30. The metering control unit 25 then waits until this point in time, and then triggers the actuation of the at least one metering valve 20 at exactly the desired time.

Figure 3:
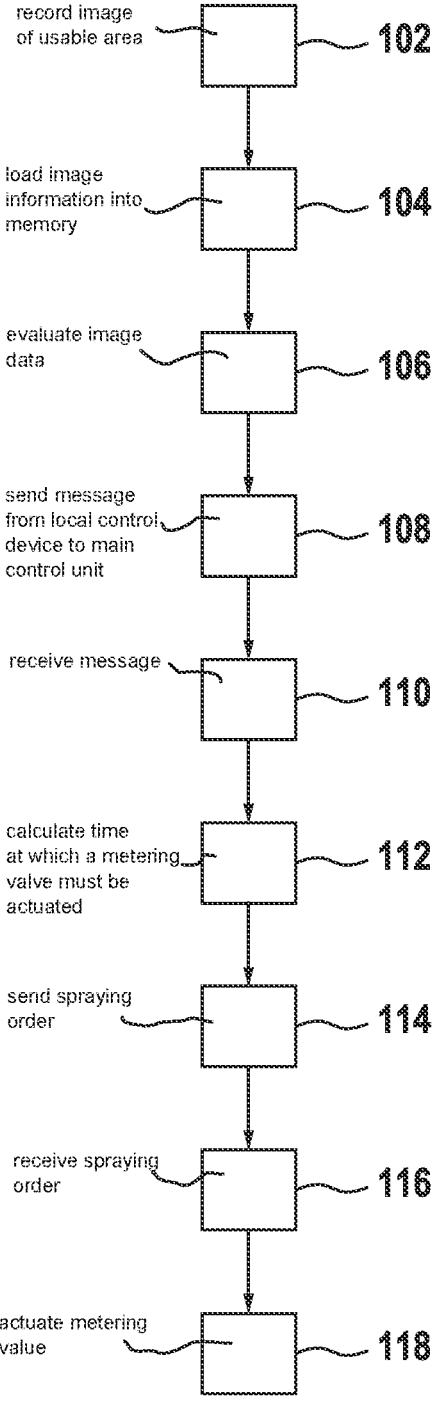
FIG. 3 shows a flowchart explaining a time synchronization at a recording and spraying device, according to an example embodiment of the present invention.

With regard to the time sequence described so far, in the reference is made below to the flow chart in FIG. 3. Here, the information exchange between a local control unit 18, the main control unit 30, and the metering control unit 25 assigned to the local control unit 18 is explained as follows:

In a first step 102, an image of the usable area NF is recorded by a sensor unit 14. Next, in a second step 104, the image information is loaded into the memory of the local control unit 18. Next, in a third step 106, an evaluation of the image data by the algorithm 19 takes place in the local control unit 18, with the decision being made whether a treatment is required within a local area of the usable area NF. If this is the case, the sending of a corresponding message from the local control device 18 via the CAN bus system 26 to the main control unit 30 takes place in a fourth step 108. The message also includes the counter state of the second counter 34 at the time the image was captured by the sensor unit 14. Next, in a fifth step 110, the corresponding message is received by the main control unit 30. In a sixth step 112, the main control unit 30 then calculates a time (in the near future) at which a metering valve 20 required for the treatment of the usable surface NF must be actuated. This is done on the basis of the geometry of the arrangement of the sensor unit 14, the speed of the metering valve 20 or the vehicle 1 over the usable area NF, the valve opening time, the spray flight time from the metering valve 20 to the ground of the usable area NF, and other parameters. Next, in a seventh step 114, a corresponding spraying order is sent by the main control unit 30 on the CAN bus system 26 for the corresponding metering valve 20. In an eighth step 116, the corresponding message is then received by the local metering control unit 25. This unit evaluates the time at which the corresponding metering valve 20 is to be actuated, and waits until this time is reached. Finally, in accordance with a ninth step 118, an actuation of the metering valve 20 takes place, so that the medium or spraying agent begins precisely in the region of an image lower edge 38 (FIG. 2) of the image made at the time of capture. The metering takes place until the spraying agent S or medium has exactly covered the height of the image in the direction of travel FR.

The method described so far can be modified in many ways without deviating from the idea of the present invention. For example, it can be provided to measure an average runtime of a time message of the main control unit 30 on the CAN bus system 26 and to take it into account when calculating the own offset of the counter states 34 and 36 of the local control units 18 and of the metering control units 25. Furthermore, each participant in the synchronization can also distribute its own adjusted offset to all other participants via the CAN bus system 26. When sending a time-related message, the local time of the sender and an ID of the sender are entered. The receiver then carries out the transformation to its own time or counter state on the basis of the already known offset of the sender and its own adapted offset. Optionally, the ID of the sender does not need to be transmitted if the sender is unambiguously determined via the message ID of the CAN message.

The agricultural vehicle 1, with a recording and spraying device 10 arranged at its rear, has also been described and presented. However, the scope of the present invention should also include those agricultural vehicles 1 in which the recording and spraying device 10 is designed or arranged, for example, in the form of a towed trailer or the like. Self-driving vehicles 1 are also intended to be covered by the disclosure of the present application.

The invention claimed is:

1. A method for treating a usable agricultural area using a liquid medium or spraying agent, the method comprising the following steps:

driving an agricultural vehicle over a usable area;

when the usable area is driven over, recording transversely to a travel direction of a recording and spraying device, the usable area to be treated, using a plurality of image-capturing sensor units which each has a respective recording range;

processing image information from a sensor unit of the sensor units using a local control unit assigned to the sensor unit;

determining that it is necessary to actuate at least one metering valve for the medium or spraying agent;

when it is necessary to actuate at least one metering valve, assigned to the respective recording range, for the medium or spraying agent, transmitting information between the local control unit and a main control unit on at least one CAN bus system;

calculating by the main control unit a time for the actuation of the metering valve and transmitting the time via the at least one CAN bus system to a local metering control unit assigned to the metering valve; and carrying out a synchronization between the main control unit, the local control unit, and the metering control unit for the activation, at the time, of the metering valve by starting a first counter in the main control unit, a second counter in the local control unit, and a third counter in the metering control unit, by a counter state of the first counter being recorded by the second and third counters, and a difference of the counter state of the first counter, a counter state of the second counter, and a counter state of the third counter being taken into account in the actuation of the metering valve by the metering control unit.

2. The method according to claim 1, wherein the counter state of the first counter is transmitted at regular intervals via the at least one CAN bus system, wherein immediately before the counter state of the first counter is transmitted, a callback for updating the counter state of the first counter is carried out, and a difference between the counter state of the first counter and the counter state of the second counter and a difference between the counter state of the first counter and the counter state of the third counter is calculated and stored upon each reception by the local control device and the metering control device.

3. The method according to claim 2, wherein when the counter state of the first counter is received in the second counter and the third counter, a callback is immediately carried out to record the counter state of the second counter and the counter state of the third counter.

4. The method according to claim 2, wherein a duration of a message transmitted by the main control unit relating to the counter state of the first counter between the transmitting of the message and its receipt by the local control unit and/or the metering control unit is recorded and taken into account in the calculation of the difference between the counter state of the first counter and the counter state of the counter state of the second counter, and between the counter state of the first counter and the counter state of the third counter.

5. The method according to claim 1, wherein the first, second, and third counters have a range of $2^{32}-1$ steps before they overflow and start again at 0, a time interval of 1 μs is provided when the first, second, and third counters are incremented between two steps.

6. The method according to claim 1, items of the information from the local control units are fed individually into the at least one CAN bus system in a defined sequence and at defined intervals.

7. The method according to claim 1, wherein a starting of the first, second, and third counters takes place at different times.

8. The method according to claim 1, wherein the time of the activation of the metering valve is calculated by the metering control unit based on a geometry and/or an arrangement of the recording range of the sensor unit and of the metering valve with respect to the usable agricultural area, a driving speed of an agricultural vehicle carrying the recording and spraying device in the direction of travel, and parameters of the metering valve.

9. A non-transitory data carrier on which is store an algorithm for treating a usable agricultural area using a liquid medium or spraying agent, the method algorithm, when carried out by a recording and spraying device, causing the recording and spraying device to perform the following steps:

when the usable area is driven over, recording transversely to a travel direction of the recording and spraying device, the usable area to be treated, using a plurality of image-capturing sensor units which each has a respective recording range;

processing image information from a sensor unit of the sensor units using a local control unit assigned to the sensor unit;

when it is necessary to actuate at least one metering valve, assigned to the respective recording range, for the medium or spraying agent, transmitting information between the local control unit and a main control unit on at least one CAN bus system;

calculating by the main control unit a time for the actuation of the metering valve and transmitting the time via the at least one CAN bus system to a local metering control unit assigned to the metering valve; and carrying out a synchronization between the main control unit, the local control unit, and the metering control unit for the activation, at the time, of the metering valve by starting a first counter in the main control unit, a second counter in the local control unit, and a third counter in the metering control unit, by a counter state of the first counter being recorded by the second and third counters, and a difference of the counter state of the first counter, a counter state of the second counter, and a counter state of the third counter being taken into account in the actuation of the metering valve by the metering control unit.

10. A recording and spraying device for an agricultural vehicle, comprising:

a plurality of image-capturing sensor units;

a plurality of metering valves assigned to the sensor units;

a plurality of local control units assigned to the image-capturing sensor units;

a plurality of metering control units assigned to the metering valves; and a main control unit, wherein the main control unit, the local control units, and the metering control units, are connected to one another for data transmission by at least one CAN bus system, and wherein the main control unit, the local control units, and the metering control units are configured to perform a method for treating a usable agricultural area using a liquid medium or spraying agent, the method comprising the following steps:

when the usable area is driven over, recording transversely to a travel direction of the recording and spraying device, the usable area to be treated, using the plurality of image-capturing sensor units which each has a respective recording range;

processing image information from a sensor unit of the sensor units using a local control unit assigned to the sensor unit;

when it is necessary to actuate at least one of the metering valves, assigned to the respective recording range, for the medium or spraying agent, transmitting information between the local control unit assigned to the sensor unit and the main control unit on at least one CAN bus system;

calculating by the main control unit a time for the actuation of the metering valve and transmitting the time via the at least one CAN bus system to the local metering control unit assigned to the metering valve; and carrying out a synchronization between the main control unit, the local control unit, and the metering control unit for the activation, at the time, of the metering valve by starting a first counter in the main control unit, a second counter in the local control unit, and a third counter in the metering control unit, by a counter state of the first counter being recorded by the second and third counters, and a difference of the counter state of the first counter, a counter state of the second counter, and a counter state of the third counter being taken into account in the actuation of the metering valve by the metering control unit.

\* \* \* \* \*